(12) United States Patent
Lee et al.

(10) Patent No.: US 10,404,179 B1
(45) Date of Patent: Sep. 3, 2019

(54) LOW VOLTAGE DC-DC CONVERTER FOR VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Dae Woo Lee, Incheon (KR); Woo Young Lee, Yongin-Si (KR); Min Seong Choi, Daejeon (KR); Tae Jong Ha, Seoul (KR); Jae Eun Cha, Gwangmyeong-Si (KR); Jin Myeong Yang, Busan (KR); In Yong Yeo, Bucheon-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/132,720

(22) Filed: Sep. 17, 2018

(30) Foreign Application Priority Data

Mar. 2, 2018 (KR) ......................... 10-2018-0025383

(51) Int. Cl.
| | |
|---|---|
| *H02M 3/335* | (2006.01) |
| *H02M 3/337* | (2006.01) |
| *B60L 11/18* | (2006.01) |
| *H02M 1/08* | (2006.01) |

(52) U.S. Cl.
CPC ..... *H02M 3/33546* (2013.01); *B60L 11/1851* (2013.01); *H02M 1/08* (2013.01); *H02M 3/337* (2013.01); *B60L 2210/10* (2013.01)

(58) Field of Classification Search
CPC ............ H02M 3/04; H02M 3/22; H02M 3/24; H02M 3/28; H02M 3/325; H02M 3/335; H02M 3/33546; H02M 3/337; H02M 1/08; B60L 2210/10
See application file for complete search history.

(56) References Cited

U.S. PATENT DOCUMENTS

| | | | |
|---|---|---|---|
| 2006/0037461 A1* | 2/2006 | Yasumura ................. | H01F 3/14 84/730 |
| 2009/0200995 A1* | 8/2009 | Tran ..................... | H02M 3/1582 323/222 |
| 2011/0018516 A1* | 1/2011 | Notman .............. | H02M 3/1588 323/284 |

(Continued)

FOREIGN PATENT DOCUMENTS

KR 10-2017-0070394 A 6/2017

*Primary Examiner* — Adolf D Berhane
(74) *Attorney, Agent, or Firm* — Morgan, Lewis & Bockius LLP

(57) ABSTRACT

A low voltage DC-DC converter for a vehicle includes: a switching circuit including a plurality of capacitors and a plurality of switches and converting a high voltage output from a high voltage battery into an AC voltage; a transformer converting the AC voltage output from the switching circuit into a low voltage; a current sensor measuring a current value output from the transformer; and a controller comparing the current value measured by the current sensor with a reference value to determine whether a current mode is a continuous current mode or a discontinuous current mode, and controlling one of the plurality of switches to be turned on or off as the determination result.

13 Claims, 3 Drawing Sheets

(56) References Cited

U.S. PATENT DOCUMENTS

| | | | | |
|---|---|---|---|---|
| 2013/0169248 A1* | 7/2013 | Zhang | .................... | H02M 3/158 323/271 |
| 2013/0229832 A1* | 9/2013 | Patel | ................. | H02M 3/33507 363/21.12 |
| 2014/0003104 A1* | 1/2014 | Greenfeld | ............... | H02M 7/04 363/84 |
| 2018/0183317 A1* | 6/2018 | Nakahara | .............. | H02M 3/155 |
| 2018/0294731 A1* | 10/2018 | Song | ................ | H02M 3/33569 |
| 2019/0089264 A1* | 3/2019 | Hirose | ................. | H02M 3/285 |

\* cited by examiner

FIG. 1  -PRIOR ART-

LOW VOLTAGE DC-DC CONVERTER FOR VEHICLE AND METHOD OF CONTROLLING THE SAME

CROSS REFERENCE TO RELATED APPLICATION

The present application claims priority to Korean Patent Application No. 10-2018-0025383, filed on Mar. 2, 2018, the entire contents of which is incorporated herein for all purposes by this reference.

TECHNICAL FIELD

The present disclosure relates to a low voltage DC-DC converter for a vehicle and a method of controlling the same, and more particularly, to a low voltage DC-DC converter for a vehicle capable of improving controllability of a low voltage DC-DC converter while reducing an internal pressure of a switch in the low voltage DC-DC converter, and a method of controlling the same.

BACKGROUND

Generally, a hybrid vehicle includes a high voltage main battery which is a fuel cell and a low voltage auxiliary battery for supplying a voltage to each electric load of the vehicle. In addition, a low voltage DC-DC converter (LDC) for reducing a voltage output from the main battery is provided between the main battery and the auxiliary battery.

FIG. 1 shows a circuit configuration of a conventional low voltage DC-DC converter. Referring to FIG. 1, in the circuit of the conventional low voltage DC-DC converter, a maximum voltage of a main switch is inversely proportional to a capacitance of a capacitor. More specifically, as the capacitance of the capacitor increases, the maximum voltage of the main switch decreases, and as the capacitance of the capacitor decreases, the maximum voltage of the main switch increases. That is, as the capacitance of the capacitor is increased, the maximum voltage of the main switch is reduced, such that the main switch can be more freely selected.

On the other hand, in the circuit of the conventional low voltage DC-DC converter, as the capacitance of the capacitor is reduced, a resonance frequency of the capacitance and inductance is located outside a frequency band for stably controlling the low voltage DC-DC converter, resulting in making the controllability easy. However, if the capacitance of the capacitor is increased to reduce the maximum voltage of the main switch, the resonance frequency of the capacitance and the inductance may be located within the frequency band for stable control of the low voltage DC-DC converter, which leads to the deterioration in the controllability.

SUMMARY

An object of the present disclosure is to provide a low voltage DC-DC voltage converter for a vehicle capable of reducing a maximum voltage of a main switch while improving controllability of the low voltage DC-DC converter, by appropriately controlling a capacitance of a capacitor in the low voltage DC-DC converter for a vehicle, and a method of controlling the same.

According to an exemplary embodiment of the present disclosure, a low voltage DC-DC converter for a vehicle includes: a switching circuit including a plurality of capacitors and a plurality of switches and converting a high voltage output from a high voltage battery into an AC voltage; a transformer converting the AC voltage output from the switching circuit into a low voltage; a current sensor measuring a current value output from the transformer; and a controller comparing the current value measured by the current sensor with a pre-stored reference value to determine whether a current mode is a continuous current mode or a discontinuous current mode, and controlling one of the plurality of switches to be turned on or off as the determination result.

The switching circuit may include a first capacitor, a second capacitor, a first switch, a second switch, and an auxiliary switch.

The first capacitor and the second capacitor may be connected to each other in parallel, and the second capacitor and the auxiliary switch may be connected to each other in series.

If the current value measured by the current sensor is equal to or less than the reference value, the controller may determine that the current mode is the discontinuous current mode and control the auxiliary switch to be turned off.

If the auxiliary switch is turned off, a capacitance of the capacitor of the switching circuit may be reduced.

If the current value measured by the current sensor exceeds the reference value, the controller may determine that the current mode is the continuous current mode and control the auxiliary switch to be turned on.

If the auxiliary switch is turned on, the capacitance of the capacitor of the switching circuit may be increased.

The low voltage DC-DC converter for a vehicle may further include: an auxiliary circuit including a rectifier configured to include a plurality of diodes and an LC filter unit configured to include an inductor and a capacitor.

The rectifier may rectify the current output from the transformer.

The LC filter unit may smooth the current rectified by a rectifier and convert the smoothed current into a DC current.

According to another exemplary embodiment of the present disclosure, there is provided a method of controlling a low voltage DC-DC converter for a vehicle including: measuring a current value output from a transformer; determining whether a current mode is a continuous current mode or a discontinuous current mode by comparing the measured current value with a pre-stored reference value; and controlling one switch in a switching circuit to be turned on or off as the determination result.

In the controlling of the one switch in the switching circuit to be turned on or off as the determination result, if the measured current value is equal to or less than the reference value as the determination result, it may be determined that the current mode is the discontinuous current mode and the one switch in the switching circuit may be turned off.

In the controlling of the one switch in the switching circuit to be turned on or off as the determination result, if the measured current value exceeds the reference value as the determination result, it may be determined that the current mode is the continuous current mode and the one switch in the switching circuit may be turned on.

DETAILED DESCRIPTION OF THE EMBODIMENTS

Hereinafter, a low voltage DC-DC converter for a vehicle and a method of controlling the same according to exemplary embodiments of the present disclosure will be described with reference to the accompanying drawings.

Figure 1:
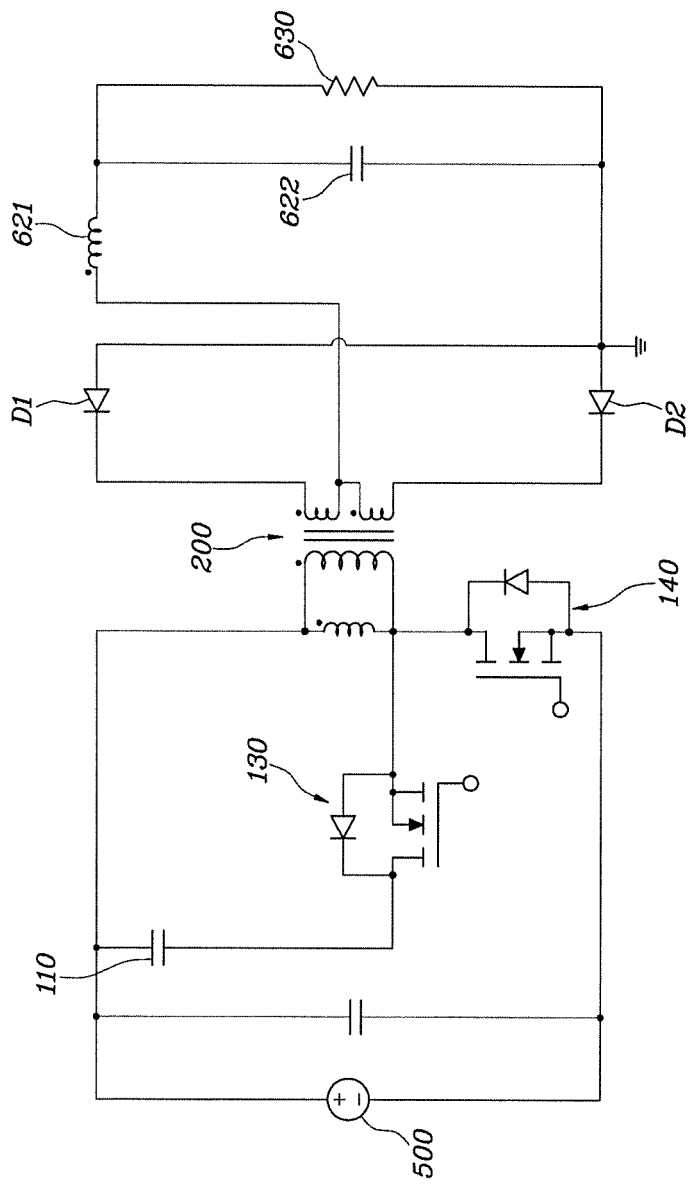
FIG. 1 is a diagram showing a circuit configuration of a conventional low voltage DC-DC converter.
Figure 2:
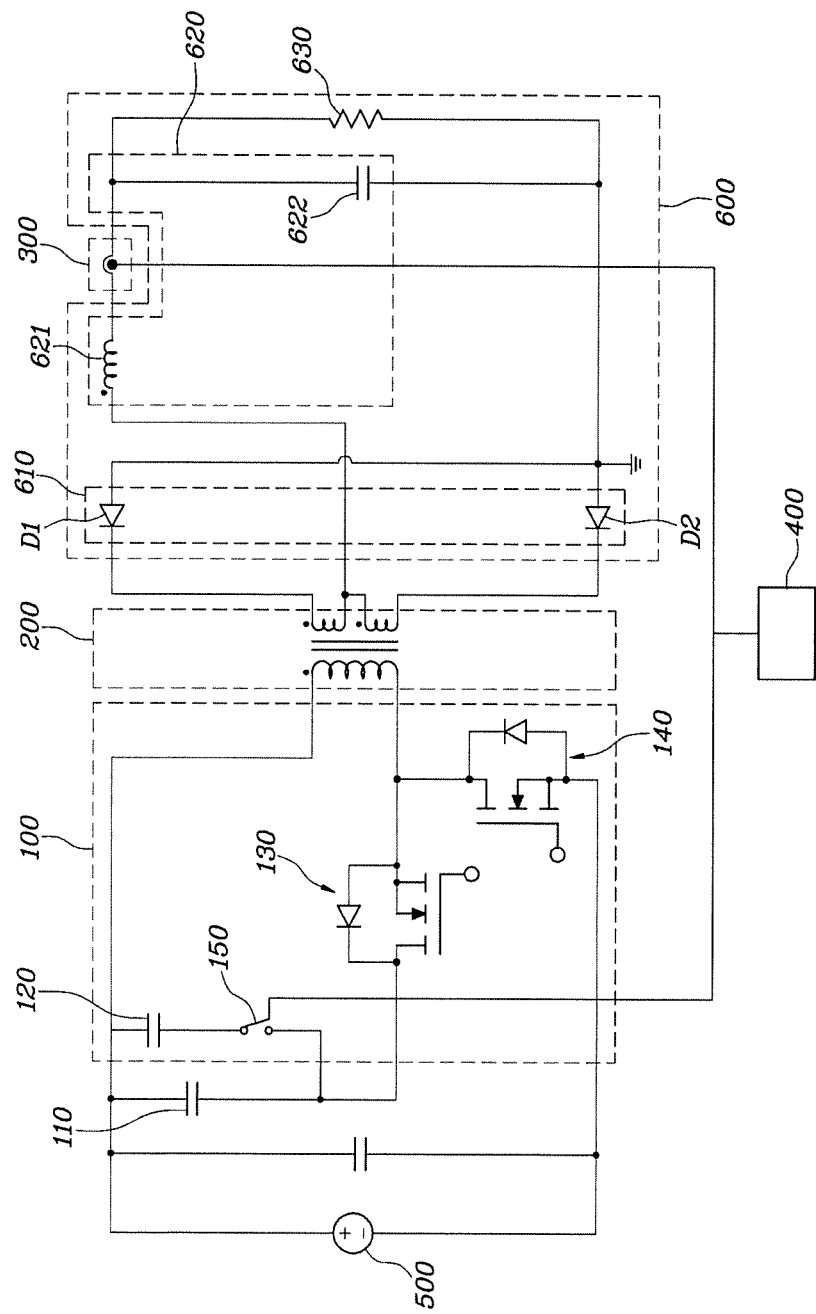
FIG. 2 is a diagram showing a circuit configuration of a low voltage DC-DC converter according to an exemplary embodiment of the present disclosure.

FIG. 2 is a diagram showing a circuit configuration of a low voltage DC-DC converter according to an exemplary embodiment of the present disclosure. As shown in FIG. 2, a low voltage DC-DC converter according to an exemplary embodiment of the present disclosure may be configured to include a switching circuit 100, a transformer 200, a current sensor 300, and a controller 400.

Specifically, the switching circuit 100 includes a plurality of capacitors and a plurality of switches, and serves to convert a high voltage output from a high voltage battery to an AC voltage. Referring to FIG. 2, the switching circuit 100 may be configured to include a first capacitor 110, a second capacitor 120, a first switch 130, a second switch 140, and an auxiliary switch 150. More specifically, the first capacitor 110 and the second capacitor 120 may be connected to each other in parallel, and the second capacitor 120 and the auxiliary switch 150 may be connected to each other in series.

In addition, the first switch 130 may be connected between an anode of a high voltage battery 500 and a primary side of the transformer 200, and the second switch 140 may be connected between a negative electrode of the high voltage battery 500 and the primary side of the transformer 200.

The transformer 200 converts the AC voltage output from the switching circuit 100 into a low voltage. At this time, the transformer 200 has a turn ratio of 1:N, and may be a transformer to which a center tap applied according to an exemplary embodiment. Here, the transformer is the known technology, and a detailed description thereof will be omitted.

The current sensor 300 measures a current value output from the transformer 200. According to the present disclosure, the controller 400 may be used to determine whether a current mode is a discontinuous current mode or a continuous current mode depending on the current value output from the transformer 200 through the current sensor 300.

In the present disclosure, the current sensor 300 may include an ammeter for measuring a current in a circuit.

The controller 400 compares the current measured by the current sensor 300 with a pre-stored reference value to determine whether the current mode is the continuous current mode or the discontinuous current mode. As the comparison result, the controller 400 may control one of a plurality of switches included in the switching circuit 100 to be turned on/off. More specifically, if the current value measured by the current sensor 300 is equal to or less than the pre-stored reference value, the controller 400 determines that the current mode is the discontinuous current mode and may control the auxiliary switch 150 of the switching circuit 100 to be turned off. At this time, when the auxiliary switch 150 is turned off, a capacitance of a capacitor of the switching circuit 100 may be reduced. More specifically, since power output from the high voltage battery 500 is not supplied to the second capacitor 120 when the auxiliary switch 150 is turned off, the capacitance of the capacitor of the switching circuit 100 may be equal to that of the first capacitor 110. That is, when the auxiliary switch 150 is turned off, the reduction in the capacitance of the capacitor of the switching circuit 100 may mean that the capacitance of the capacitor of the switching circuit 100 is relatively reduced, as compared with the case where the auxiliary switch 150 is turned on.

If the current value measured by the current sensor 300 exceeds the pre-stored reference value, the controller 400 determines that the current mode is the continuous current mode and may control the auxiliary switch 150 of the switching circuit 100 to be turned on. At this time, when the auxiliary switch 150 is turned on, the capacitance of the capacitor of the switching circuit 100 may be increased. More specifically, when the auxiliary switch 150 is turned on, the power output from the high voltage battery 500 is supplied to the first capacitor 110 and the second capacitor 120, such that the capacitance of the capacitor of the switching circuit 100 may be a sum of the capacitances of the first capacitor 110 and the second capacitor 120. That is, when the auxiliary switch 150 is turned on, the capacitance of the capacitor of the switching circuit 100 may be relatively increased, as compared with the case where the auxiliary switch 150 is turned off.

As described above, the controller 400 compares the current value measured by the current sensor 300 with the pre-stored reference value to determine whether the current mode is the continuous current mode or the discontinuous current mode. As the determination result, if it is determined that the current mode is the discontinuous current mode, the auxiliary switch 150 is turned off to reduce the capacitance of the switching circuit 100, and if it is determined that the current mode is the continuous current mode, the auxiliary switch 150 is turned on to increase the capacitance of the switching circuit 100, thereby reducing the maximum voltage of the second switch 140 while improving the controllability of the low voltage DC-DC converter.

The low voltage DC-DC converter for a vehicle according to the exemplary embodiment of the present disclosure may further include an auxiliary circuit 600. Referring to FIG. 2, the auxiliary circuit 600 may be configured to include a rectifier 610 and an LC filter unit 620. More specifically, the rectifier 610 may be configured to include a plurality of diodes D1 and D2, and the LC filter unit 620 may be configured to include an inductor 621 and a capacitor 622.

More specifically, in the rectifier 610, an anode of the first diode D1 may be connected to one end of a secondary winding of the transformer 200, an anode of the second diode D2 may be connected to the other end of the secondary winding of the transformer 200, and cathodes of the first diode D1 and the second diode D2 may be connected to the LC filter unit 620 while being connected to each other. Here, the rectifier 610 may rectify a current output from the transformer.

In addition, in the LC filter unit 620, the inductor 621 may be connected between the cathodes of the first diode D1 and the second diode D2 and the capacitor 622, and the capacitor 622 may be connected in parallel to a load 630 including a low voltage battery (not shown) and the like. Here, the LC filter unit 620 may smooth the current rectified through the rectifier 610 and convert the smoothed current into a DC current.

Figure 3:
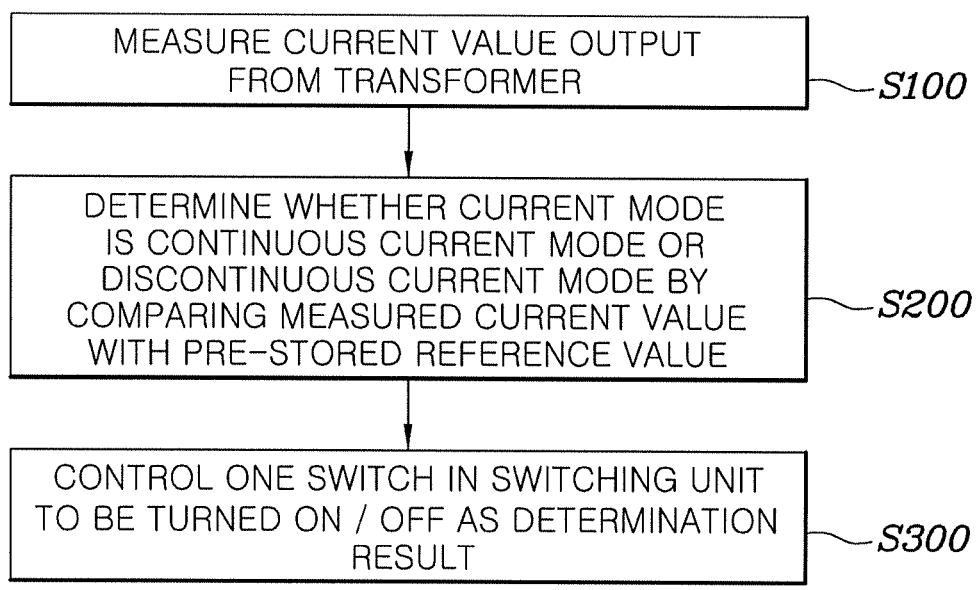
FIG. 3 is a flowchart illustrating a method of controlling a low voltage DC-DC converter according to an exemplary embodiment of the present disclosure.

FIG. 3 is a flowchart illustrating a method of controlling a low voltage DC-DC converter according to an exemplary embodiment of the present disclosure. As shown in FIG. 3, the method of controlling a low voltage DC-DC converter may include measuring a current value output from a transformer, comparing the measured current value with a pre-stored reference value to determine whether a current mode is a continuous current mode or a discontinuous current mode, and controlling one switch in a switching circuit to be turned on/off as the determination result.

More specifically, in the controlling of one switch in the switching circuit to be turned on/off as the determination result, if the measured current value is equal to or less than the pre-stored reference value as the determination result, it is determined that the current mode is the discontinuous current mode and one switch in the switching circuit may be turned off. At this time, the controller may control the auxiliary switch in the switching circuit to be turned off. Here, as the auxiliary switch is turned off, the capacitance of the capacitor of the switching circuit may be reduced. The reduction in the capacitance of the capacitor of the switching circuit has been described above while explaining the low voltage DC-DC converter, and therefore a description thereof will be omitted.

Meanwhile, in the controlling of one switch in the switching circuit to be turned on/off as the determination result, if the measured current value exceeds the reference value as the determination result, it is determined that the current mode is the discontinuous current mode and one switch in the switching circuit may be turned on. At this time, the controller may control the auxiliary switch in the switching circuit to be turned on. Here, as the auxiliary switch is turned on, the capacitance of the capacitor of the switching circuit may be increased. The increase in the capacitance of the capacitor of the switching circuit has been described above while explaining the low voltage DC-DC converter, and therefore a description thereof will be omitted.

According to the exemplary embodiment of the present disclosure, the controller compares the current value measured by the current sensor with the pre-stored reference value to determine whether the current mode is the continuous current mode or the discontinuous current mode. As the determination result, if it is determined that the current mode is the discontinuous current mode, the auxiliary switch is turned off to reduce the capacitance of the switching circuit, and if it is determined that the current mode is the continuous current mode, the auxiliary switch is turned on to increase the capacitance of the switching circuit, thereby reducing the maximum voltage of the main switch while improving the controllability of the low voltage DC-DC converter.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A low voltage DC-DC converter for a vehicle, comprising:
   a switching circuit including a plurality of capacitors and a plurality of switches and converting a high voltage output from a high voltage battery into an AC voltage;
   a transformer converting the AC voltage output from the switching circuit into a low voltage;
   a current sensor measuring a current value output from the transformer; and
   a controller comparing the current value measured by the current sensor with a reference value to determine whether a current mode is a continuous current mode or a discontinuous current mode, and controlling one of the plurality of switches to be turned on or off based on a determination result.

2. The low voltage DC-DC converter of claim 1, wherein the switching circuit includes a first capacitor, a second capacitor, a first switch, a second switch, and an auxiliary switch.

3. The low voltage DC-DC converter of claim 2, wherein the first capacitor and the second capacitor are connected to each other in parallel, and the second capacitor and the auxiliary switch are connected to each other in series.

4. The low voltage DC-DC converter of claim 2, wherein if the current value measured by the current sensor is equal to or less than the reference value, the controller determines that the current mode is the discontinuous current mode and controls the auxiliary switch to be turned off.

5. The low voltage DC-DC converter of claim 4, wherein if the auxiliary switch is turned off, a capacitance of the capacitor of the switching circuit is reduced.

6. The low voltage DC-DC converter of claim 2, wherein if the current value measured by the current sensor exceeds the reference value, the controller determines that the current mode is the continuous current mode and controls the auxiliary switch to be turned on.

7. The low voltage DC-DC converter of claim 6, wherein if the auxiliary switch is turned on, the capacitance of the capacitor of the switching circuit is increased.

8. The low voltage DC-DC converter of claim 1, further comprising:
   an auxiliary circuit including a rectifier configured to include a plurality of diodes and a inductor-capacitor (LC) filter unit configured to include an inductor and a capacitor.

9. The low voltage DC-DC converter of claim 8, wherein the rectifier rectifies the current output from the transformer.

10. The low voltage DC-DC converter of claim 8, wherein the LC filter unit smoothes the current rectified by the rectifier and converts the smoothed current into a DC current.

11. A method of controlling a low voltage DC-DC converter for a vehicle, the method comprising steps of:
    measuring, by a current sensor, a current value output from a transformer;
    determining, by a controller, whether a current mode is a continuous current mode or a discontinuous current mode by comparing the measured current value with a reference value; and
    controlling, by the controller, one switch in a switching circuit to be turned on or off as a determination result.

12. The method of claim 11, wherein in the step of controlling of the one switch, if the measured current value is equal to or less than the reference value as the determination result, it is determined that the current mode is the discontinuous current mode and the one of switches in the switching circuit is turned off.

13. The method of claim 11, wherein in the step of controlling of the one switch, if the measured current value exceeds the reference value as the determination result, it is determined that the current mode is the continuous current mode and the one of switches in the switching circuit is turned on.

* * * * *